Figure 1:
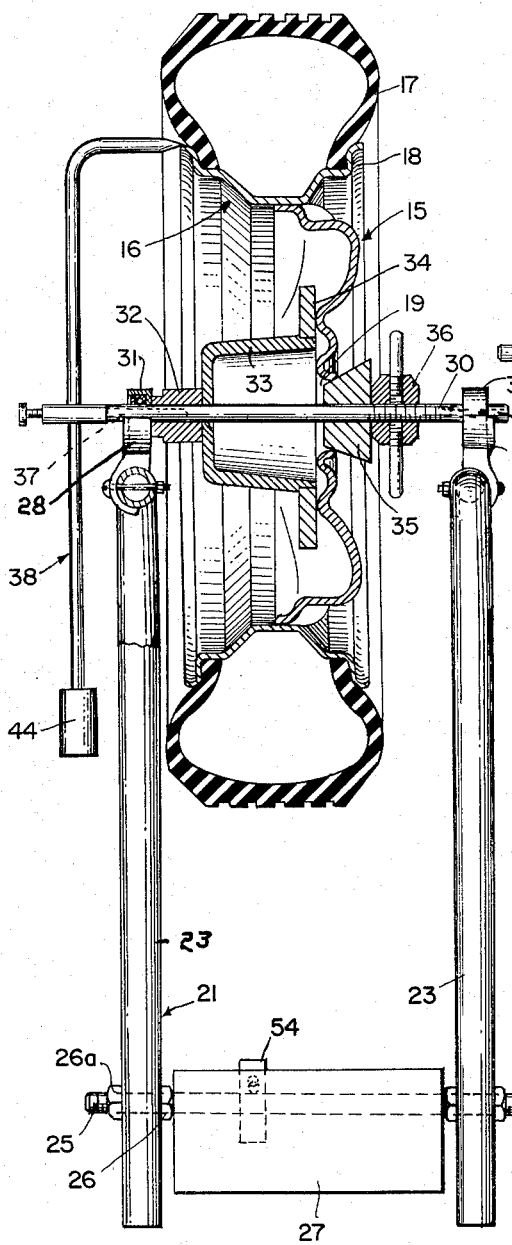

April 13, 1965     J. A. JOHNSON     3,177,725
EQUIPMENT FOR USE IN WHEEL BALANCING
Filed Nov. 25, 1960     2 Sheets-Sheet 1

INVENTOR.
James A. Johnson
BY
ATTORNEY

April 13, 1965  J. A. JOHNSON  3,177,725
EQUIPMENT FOR USE IN WHEEL BALANCING
Filed Nov. 25, 1960  2 Sheets-Sheet 2
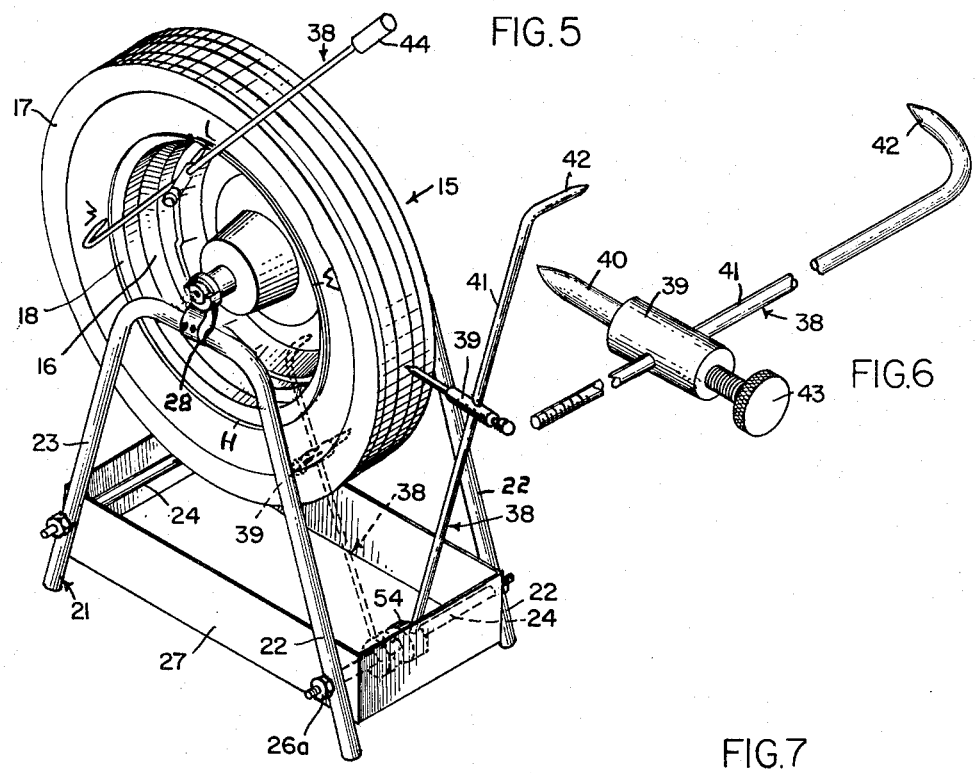
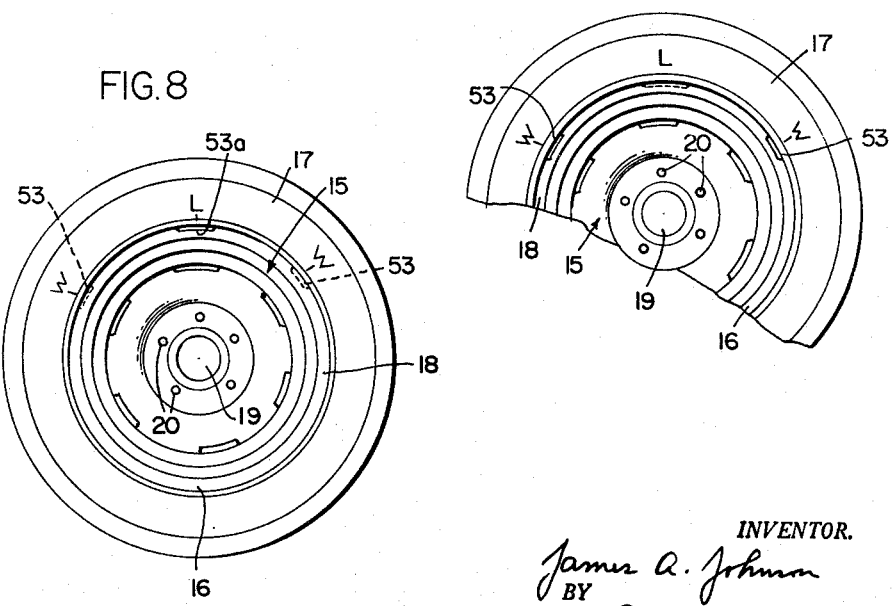
INVENTOR.
James A. Johnson
BY
ATTORNEY 3,177,725
EQUIPMENT FOR USE IN WHEEL BALANCING
James A. Johnson, South Portland, Maine, assignor to Eastern Di-Namics Corporation, a corporation of Maine
Filed Nov. 25, 1960, Ser. No. 71,753
3 Claims. (Cl. 73—480)

The present invention relates to equipment for use in balancing wheels and is a continuation-in-part of my copending application Serial No. 848,686, filed October 26, 1959, and which is now abandoned.

Automobile wheels usually need to be balanced to eliminate the effects of imbalances as such result in objectionable vibrations, at least in certain speed ranges, and often make steering both difficult and dangerous. Wheel balancing is effected by adding weights to counterbalance the heavy part of the wheel and, at the present time, the apparatus for use in so doing, with acceptable accuracy, is costly.

The general objective of the present invention is to provide wheel balancing apparatus that are simple and inexpensive but ensure that the wheel balancing operation, while quickly and easily effected, is a precision one. In this connection, the term "wheel," as used herein and in the claims, means the wheel by itself or the wheel together with its drum and hub.

This general objective is attained, in accordance with the invention, by first balancing the wheel while it is free to turn in order to determine its heavy point and a diametrically opposite spot that may be regarded as the light point. This step is preferably performed with the wheel mounted in a special stand in accordance with the invenition, and the above mentioned heavy and light points are preferably located on the inner face of the wheel rim. The wheel is also checked to determine the extent of any lateral (dynamic) or radial (static) deviations from normal as excessive deviations mean that the wheel cannot be brought into balance to a satisfactory extent.

Weight is then added to the light point until the heavy point is counterbalanced and a particular objective of the invention is the provision of an attachment provided with a head adapted to be clamped to the rim, preferably on the inside thereof, and having weight receiving means by which individual weights can be supported until the wheel is brought into balance.

The weight of the attachment and the added weights are totalled and divided in two and weight equal to the quotient is added at two points on one side of the wheel, preferably the inside, each point being spaced 60° from the predetermined light point and 120° from the other, and also to the other side of the wheel at a third point transversely alined with the light point.

It is usually the best practice to repeat the wheel balancing, particularly if the weight quotient is slightly more or less than that of available weight or weight combinations, and add whatever weight is then found necessary to counterbalance the heavy point, such added weight to be attached at the third point which is on the side of the wheel opposite to that to which the pair of weights was added and, as above stated, in transverse alinement with the previously determined light point. Usually, if the available weight or combinations of weights are not equal to the quotient, weight is not added to the third point until after such re-balancing.

Another important objective of the invention is to provide an instrument that can be adapted to a wide range of wheel diameters for use in establishing the precise spacing of the added weights relative to the heavy point and to each other and also adapted for use with the stand in determining both the light point and lateral and radial deviations.

Figure 2:
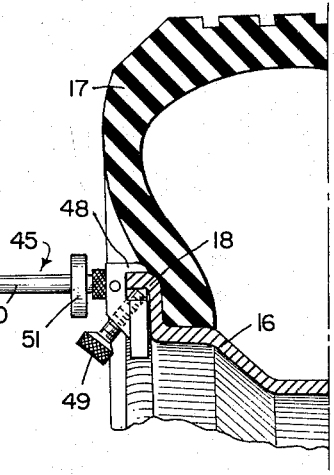
Figure 3:
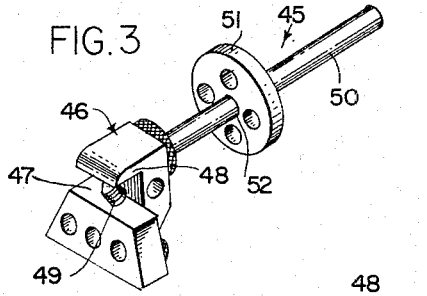
Figure 4:
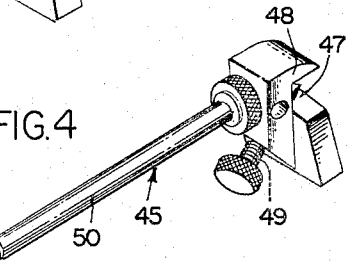

In the drawings:

FIG. 1 is a vertical cross section of an automobile wheel and a supporting stand therefor in accordance with the invention, FIG. 2 is a fragmentary cross section of the wheel with a weight receiving attachment secured to the rim at one side thereof, FIG. 3 is a perspective view of the weight receiving attachment as seen from the head end thereof, FIG. 4 is a perspective view of the attachment as seen from the free end of its spindle, FIG. 5 is a perspective view of the wheel and the stand shown in FIG. 1, illustrating the location of a pair of weight attaching points each spaced 60° from the light point of the wheel by means of a measuring instrument in accordance with the invention and the testing of the wheel by that instrument for lateral and radial deviations, FIG. 6 is a perspective view, on an increased scale, of the measuring instrument, FIG. 7 is an elevation of the inside face of the wheel to which the pair of weights are attached, and FIG. 8 is an elevation of the outside face of the wheel.

In the drawings, an automobile wheel is indicated generally at 15 and is shown as having a rim 16 which receives the tire 17 and terminates at each side thereof in an outwardly curved flange 18. The wheel 15 has a conventional central hole 19, proximate to which there is a series of holes 20 through which extend the usual attaching lugs, not shown.

In accordance with the invention, there is provided a stand, generally indicated at 21, and shown as comprising a pair of U-shaped members each defining a leg 22 and a leg 23 with corresponding legs of each member being interconnected by a cross rod 24 threaded at its ends as at 25 to receive spacing and anchoring nuts 26 and 26ᵃ, respectively. The cross rods 24 also serve to support a tray 27 through the side walls of which they extend. A flanged, arcuate bearing seat 28 is bolted to the center of each U-shaped member.

A spindle 30 has a pair of bearing discs 31, each disposed and dimensioned for entry into an appropriate one of the bearing seats 28 to be rotatably supported thereby. The spindle 30 supports the sleeve 32 of a hub 33 which has a backing flange 34. The spindle 30 also supports a frustro-conical member 35 whose smaller end is dimensioned to enter the central hole 19 of the wheel 15. In practice, there is a series of such members each differing from the other as to the range of sizes of the central wheel hole it is to enter and center and seat the wheel against the backing flange 34 when the clamping member 36 is threaded on the spindle 30 against the member 35.

When a wheel is supported in the stand, it is free to rotate. While a wheel may be balanced without detaching it from the motor vehicle, it is then subject to any defects in the supporting bearings. For that reason, the use of a stand is preferred as, not only does the stand provide precise trouble-free support for the wheel, but also the removal of the wheel makes bearing, brake, and brake hydraulic components inspection and bearing lubrication a normal operation.

With the wheel free to rotate, it comes to rest with its heavy point H lowermost. Its light point L, which is diametrically opposite the heavy point H is then found. In accordance with the invention, each end of the spindle 30 has an axial socket 37 and the light point L is found by means of the tool generally indicated at 38.

The tool 38 comprises a cylindrical hub 39 having an axial rod 40 at one end shaped and dimensioned for entry into a spindle socket 37 and to be rotatably supported thereby. The hub 39 has a transverse passage slidably receiving the stem 41 of a scriber 42. The stem 41 is shown as being locked in place by a set screw 43 threaded into engagement therewith through the other end of the hub 39 in a position establishing a scriber length and position representing the radius of the wheel being balanced from its axis to its rim. A counterweight 44 is threaded on the other end of the stem 41. With the tool adjusted to the radius of the wheel being tested, and with its rod 40 entrant of a spindle socket 37, the weight 44 ensures that the scriber 42 is vertically uppermost to indicate the point L on the rim flange.

In order that the heavy point H may be counterbalanced, the invention provides an attachment, generally indicated at 45, and shown as comprising a head 46 having a transverse slot 47 dimensioned to freely straddle a rim flange 18 with one wall establishing a rim-gripping jaw 48. An adjustable member 49 is threaded through the head 46 diagonally upwardly towards the jaw 48 for clamping engagement with the other surface of the rim. The attachment has a spindle 50 attached to the head 46 to be approximately parallel to the axis of the wheel when the attachment is clamped to its rim. The weight of the complete counterbalancing tool should be approximately 28.5 grams.

A series of weights 51 is provided. While these may differ as to the weights they represent, they are otherwise similar so that only one such weight is shown. This weight 51 is shown as a disc having an axial bore 52 to slidably receive the spindle 50. Weights are added to the spindle 50 until the combined weight of the attachment and the weights attached thereto counterbalance the heavy point H.

When the wheel is thus counterbalanced, the total weight is divided into two equal parts. Should the quotient not be capable of being divided into two equal parts with the series of weights provided, two weights 53, each as near as possible to the quotient, are selected for use and these are caught on the rim flanges 18, preferably on the inside of the wheel, at points spaced 60° from the light point L and from each other. The location of the points to which the weights 53 are to be attached is determined by centering the rod 40 on the point L and swinging the scriber through an arc intersecting the rim flange. The points of such intersection are the exact points for the attachment of the weights 53.

If the sum of the weights 53 equals the counterbalancing weight, a third weight of the same value is attached to the other side of the wheel, preferably its outside, at a point on the rim flange 18 transversely alined with the light point L. This point may be determined as by inserting the rod 40 of the tool 38 into the proximate spindle socket 37 and permitting gravity to swing the scriber 42 into a position enabling that point on the rim flange to be quickly and accurately located. After the weights 53 have been added, it is preferred that the wheel be again balanced, particularly if the total of the two weights 53 does not equal the weight of the previously selected counterbalancing weight. As the third weight may not be of the same value as the weight 53, it is identified in FIG. 8 at 53a.

The tool 38 may have its counterweight 44 removed and threaded into an adapter spool 54 on a stand cross rod 24 which is threaded to receive the stem 41 and permit it to be screwed into contact with the cross rod thus to lock it in any desired position to bring the scriber into use to enable any lateral or radial abnormalities to be detected. This operation is usually done before any counterbalancing as, if such abnormalities are excessive, precise wheel balancing is not possible.

The wheel will now be found to be accurately balanced and it will be noted that the instrumentalities for carrying out the method are simple and rugged so that low cost equipment is combined with ease and accuracy of operation in wheel balancing.

I claim:

1. A device for use in balancing a wheel, said device comprising a stand including two aligned bearing seats spaced apart in a horizontal plane, a wheel receiving spindle including bearings, one for the rotatable support by each seat, means to clamp a wheel to said spindle between said seats, said spindle having an axial bore in at least one of its ends, a tool including a hub provided with a spindle bore entering member for rotatable support thereby, a stem adjustably attached between its ends to said hub for movement radially relative to the axis of said bore entering member, one end of said stem being a scriber and the other end of said stem including a counterweight.

2. In combination, wheel balancing apparatus comprising a stand including two aligned bearing seats spaced apart in a horizontal plane, a spindle including a pair of bearings, each for support by a respective one of said seats, and means to clamp a wheel to said spindle between said bearings with said spindle axially of said wheel so that said wheel is free to rotate responsive to gravity until it comes to rest with its heavy point lowermost and with a light point spaced 180° therefrom, one end of said spindle extending outwardly beyond the proximate bearing and having an axial bore in said one end extending inwardly through the zone of the proximate bearing, and a device comprising a hub including an elongated portion for slidable entry into and rotatable support by said bore and a stem connected between its ends to said hub for sliding movement at right angles to the axis of said portion, said stem including a scriber-like end disposed parallel to said hub portion and of a length to enable the light point on the rim of the wheel to be located thereby when said hub portion is seated in said bore, said device, when detached and positioned with said hub portion in registry with said light point, enabling two points spaced equi-distant from said light point and 120° from each other to be selected by swinging its scriber-like end through an arc intersecting the rim of said wheel at two points.

3. In combination, wheel balancing apparatus comprising a stand including two aligned bearing seats spaced apart in a horizontal plane, a spindle including a pair of bearings, each for the rotatable support by a respective one of said seats, and means to clamp a wheel to said spindle between said bearings with said spindle axially of said wheel so that said wheel is free to rotate responsive to gravity until it comes to rest with its heavy point lowermost and with a light point spaced 180° therefrom, one end of said spindle extending outwardly beyond the proximate bearing and having an axial bore in said one end extending inwardly through the zone of the proximate bearing, and a device comprising a hub including an elongated portion for slidable entry into and rotatable support by said bore and a stem connected between its ends to said hub for sliding movement at right angles to the axis of said portion, said stem including a weighted end and a scriber-like end disposed parallel to said hub portion and of a length to enable the light point on the rim of the wheel to be located thereby when said hub portion is seated in said bore, said device, when detached and positioned with said hub portion in registry with said light point, enabling two points spaced equi-distant from said light point and 120° from each other to be selected by swinging its scriber-like end through an arc intersecting the rim of said wheel at two points.

(References on following page)

References Cited by the Examiner

UNITED STATES PATENTS

| | | | |
|---|---|---|---|
| 1,017,995 | 2/12 | Owen | 33—27 |
| 1,977,297 | 10/34 | Weaver | 33—203.16 |
| 2,029,561 | 2/36 | Du Sang | 73—66 X |
| 2,442,171 | 5/48 | Kalajian | 301—5 |
| 2,556,240 | 6/51 | Valentine et al. | |
| 2,585,802 | 2/52 | Loewe | 301—5 |
| 2,697,345 | 12/54 | Currier | 73—487 |
| 2,700,892 | 2/55 | Lowe | 73—457 |
| 2,752,788 | 7/56 | La Penta | 73—487 |
| 2,780,939 | 2/57 | Kellogg | 73—458 |

RICHARD C. QUEISSER, *Primary Examiner.*

CHARLES A. CUTTING, ROBERT L. EVANS,
*Examiners.*